United States Patent
Seki et al.

(10) Patent No.: US 7,995,663 B2
(45) Date of Patent: Aug. 9, 2011

(54) MULTICARRIER TRANSMITTING APPARATUS AND MULTICARRIER TRANSMITTING METHOD

(75) Inventors: Yuta Seki, Yokohama (JP); Mitsuru Uesugi, Yokohama (JP); Eiji Ota, Tokyo (JP)

(73) Assignee: Panasonic Corporation, Osaka (JP)

( * ) Notice: Subject to any disclaimer, the term of this patent is extended or adjusted under 35 U.S.C. 154(b) by 787 days.

(21) Appl. No.: 11/917,745

(22) PCT Filed: Jun. 21, 2006

(86) PCT No.: PCT/JP2006/312416
§ 371 (c)(1),
(2), (4) Date: Dec. 14, 2007

(87) PCT Pub. No.: WO2007/000923
PCT Pub. Date: Jan. 4, 2007

(65) Prior Publication Data
US 2009/0086834 A1  Apr. 2, 2009

(30) Foreign Application Priority Data

Jun. 27, 2005  (JP) ................................ 2005-186425

(51) Int. Cl.
*H04L 27/28*  (2006.01)
(52) U.S. Cl. ........ 375/260; 375/261; 375/295; 375/296; 375/285; 375/346
(58) Field of Classification Search .................. 375/260, 375/261, 295, 296, 285, 346
See application file for complete search history.

(56) References Cited

U.S. PATENT DOCUMENTS

| 7,151,804 | B2 * | 12/2006 | Tong et al. ..................... 375/260 |
| 2003/0012289 | A1 * | 1/2003 | Lindoff .......................... 375/262 |
| 2003/0108112 | A1 * | 6/2003 | Rudolph et al. ............. 375/261 |

FOREIGN PATENT DOCUMENTS

| JP | 09-008766 A | 1/1997 |
| JP | 2002-261724 A | 9/2002 |
| JP | 2003-298549 A | 10/2003 |
| JP | 2004-146974 A | 5/2004 |
| JP | 2004-519177 A | 6/2004 |
| JP | 2005-51457 A | 2/2005 |

* cited by examiner

*Primary Examiner* — Chieh M Fan
*Assistant Examiner* — Siu M Lee
(74) *Attorney, Agent, or Firm* — Dickinson Wright PLLC

(57) ABSTRACT

To narrow the dynamic range of multicarrier signals and prevent both the increment of cost and the degradation of power efficiency. A modulating part (101) modulates transport data. An S/P converting part (102) performs an S/P conversion of a modulated symbol and outputs the modulated symbols, the number of which is the same as the number of all subcarriers, to an IFFT part (103) in parallel. The IFFT part (103) assigns the modulated symbols to the subcarriers, the frequencies of which are orthogonal to each other, to perform an inverse fast Fourier transform. A P/S converting part (104) performs a P/S conversion of the signals of time domain. When the instantaneous amplitude level of an OFDM signal is lower than a predetermined threshold value, a pit clip part (105) replaces this amplitude level by the predetermined threshold value. In other words, when the instantaneous power of the OFDM signal is close to zero, the pit clip part (105) converts a power value to a value that is greater than the actual power value.

7 Claims, 10 Drawing Sheets

MULTICARRIER TRANSMITTING APPARATUS AND MULTICARRIER TRANSMITTING METHOD

TECHNICAL FIELD

The present invention relates to a multicarrier transmission apparatus and a multicarrier transmission method. More particularly, the present invention relates to a multicarrier transmission apparatus and multicarrier transmission method where an instantaneous power value of a transmission signal may become 0.

BACKGROUND ART

Generally, in a multicarrier communication scheme such as OFDM (Orthogonal Frequency Division Multiplex), transmission signals superimposed on a plurality of subcarriers are added in the time domain, so that high peak power is produced. To be more specific, when power of one subcarrier is assumed to be P, average power of a multicarrier signal including M subcarriers becomes MP, and peak power becomes $M^2P$. More specifically, FIG. 1 illustrates a time-series power variation of the multicarrier signal when power of one subcarrier is assumed to be 1, on a complex plane. In the figure, the distance from the origin (0, 0) shows the power of the multicarrier signal and that peak power is produced in various spots.

Linearly amplifying a multicarrier signal having such high peak power requires an amplifier that can secure linearity over a wide power range, but such an amplifier causes an increase in cost and deterioration in power efficiency. Then, particularly in a multicarrier communication scheme, it is necessary to reduce peak power of a multicarrier signal beforehand and then input the result to an amplifier.

A method of reducing peak power of a multicarrier signal is disclosed in, for example, Patent Document 1.

Patent Document 1 discloses amplifying power of a multicarrier signal after converting the multicarrier signal by a function using arctangent. The arctangent is a function having mapping that gradually approximates to a predetermined value when the absolute value of an input value becomes greater, and therefore, if power of a multicarrier signal is assumed to be the input value, the mapping is always a smaller value than the predetermined value. Therefore, Patent Document 1 discloses converting power of the multicarrier signal to a smaller value than the predetermined value, reducing peak power, and then amplifying the power by an amplifier.

However, the instantaneous power of the multicarrier signal may approximate to 0 (hereinafter, this may be referred to as "zero crossing"). When the instantaneous power approximates to 0, the amplifier must keep linearity with respect to power which is close to 0, and this may also cause an increase in cost. Therefore, it is important not only to reduce peak power but also to avoid instantaneous power which is close to 0. According to Patent Document 1, arctangent is used, and, when the instantaneous power is small to a certain degree, the power is converted to a large value, so that the above-described problem can be reduced.

Moreover, as a scheme for reducing a dynamic range of a modulated signal, π/4 shift QPSK (π/4-QPSK) is well known. According to π/4-QPSK, by making the carrier phases of consecutive symbols advance by π/4 from the phase associated with transmission information, passage through the origin (zero crossing) is avoided during phase transition. By avoiding zero crossing, it is possible to reduce the dynamic range of the modulated signal. Examples of similar schemes include OQPSK (offset QPSK). Patent Document 1: Japanese Patent Application Laid-Open No. 2005-51457

DISCLOSURE OF INVENTION

Problems to be Solved by the Invention

However, in the technique disclosed in Patent Document 1, when the absolute power value is approximately 0, the absolute power value after the conversion also remains approximate to 0, and the load on the amplifier cannot be substantially reduced.

Furthermore, the technique of Patent Document 1 uses arctangent, and therefore, a maximum power value of a multicarrier signal in the dynamic range can be reduced, but the minimum value still remains 0.

Moreover, the scheme using π/4-QPSK or offset QPSK can actually narrow the dynamic range of a modulated signal in single carrier transmission, but in the case of multicarrier transmission, phases of subcarriers are independent, and therefore it is not possible to obtain any effect of canceling zero crossing.

In this way, the conventional multicarrier transmission apparatus has had a wider dynamic range of a multicarrier modulated signal than a single carrier modulated signal, and therefore has required an amplifier having a wide linear area accordingly, and consequently has involved a problem of an increase in cost and deterioration of power efficiency.

The present invention is implemented in view of the above-described problems, and it is therefore an object of the present invention to provide a multicarrier transmission apparatus and multicarrier transmission method that make it possible to narrow the dynamic range of a multicarrier signal and prevent an increase in cost and deterioration of power efficiency.

Means for Solving the Problem

The multicarrier transmission apparatus according to the present invention adopts a configuration including: a generation section that generates a multicarrier signal formed with a plurality of subcarriers; a conversion section that converts an amplitude level lower than a predetermined lower limit value of the generated multicarrier signal to an amplitude level equal to or higher than the lower limit value; and a transmission section that transmits the multicarrier signal after the amplitude level conversion.

The multicarrier transmission method according to the present invention includes steps of: generating a multicarrier signal formed with a plurality of subcarriers; converting an amplitude level lower than a predetermined lower limit value of the generated multicarrier signal to an amplitude level equal to or higher than the lower limit value; and transmitting the multicarrier signal after the amplitude level conversion.

According to these, an amplitude level lower than a predetermined lower limit value of the multicarrier signal is converted to an amplitude level equal to or higher than the lower limit value, so that it is possible to reduce small instantaneous power, narrow the dynamic range of the multicarrier signal and prevent an increase in cost and deterioration of power efficiency.

Advantageous Effect of the Invention

According to the present invention, it is possible to narrow the dynamic range of the multicarrier signal and prevent the increase in cost and deterioration of power efficiency.

BRIEF DESCRIPTION OF DRAWINGS

FIG. 8 shows a time waveform (power) of an OFDM signal before and after processing by the pit clip section according to Embodiment 3.

FIG. 9 shows a time waveform (power) of an OFDM signal before and after processing by a pit clip section according to Embodiment 4.

BEST MODE FOR CARRYING OUT THE INVENTION

Embodiments of the present invention will be explained below in detail with reference to the accompanying drawings. In the following explanations, an OFDM signal will be explained as an example of a multicarrier signal.

Embodiment 1

Figure 1:
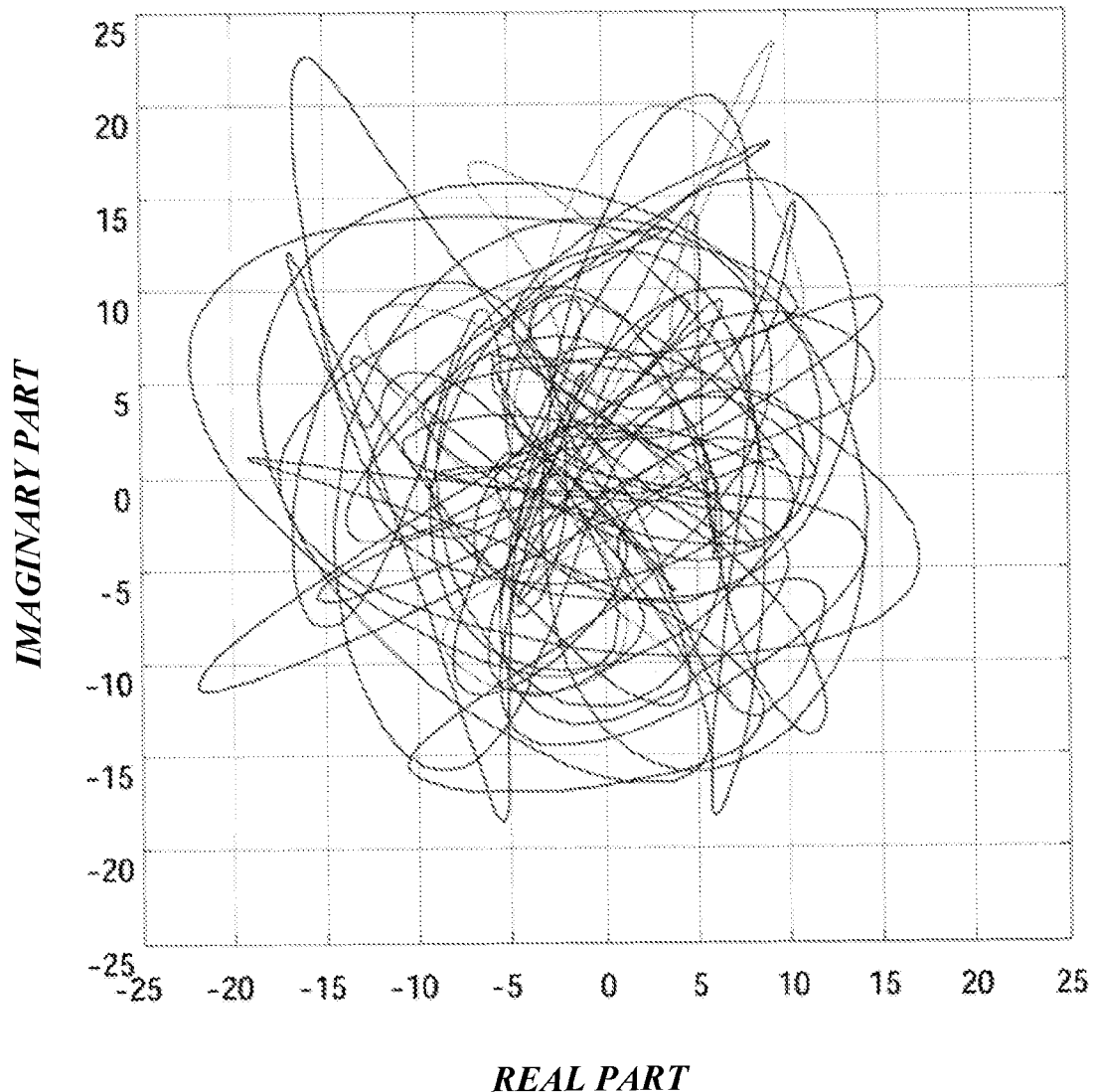
FIG. 1 shows an example of peak power in a multicarrier signal.
Figure 2:
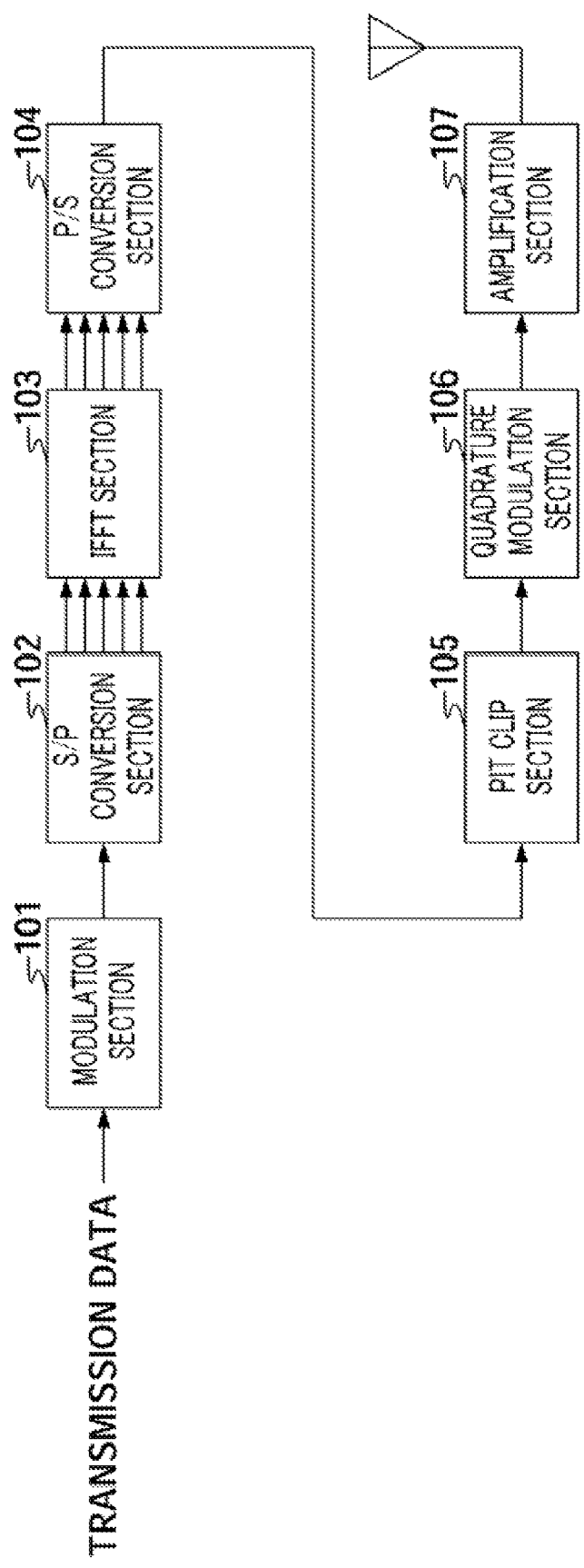
FIG. 2 is a block diagram showing the main configuration of a multicarrier transmission apparatus according to Embodiment 1 of the present invention.

FIG. 2 is a block diagram showing the main configuration of a multicarrier transmission apparatus according to Embodiment 1 of the present invention. The multicarrier transmission apparatus shown in FIG. 2 has modulation section 101, S/P (Serial/Parallel) conversion section 102, IFFT (Inverse Fast Fourier Transform) section 103, P/S (Parallel/Serial) conversion section 104, pit clip section 105, quadrature modulation section 106 and amplification section 107.

Modulation section 101 modulates transmission data and outputs obtained modulated symbols to S/P conversion section 102.

S/P conversion section 102 serial-to-parallel-converts the modulated symbols and outputs the modulated symbols corresponding to all M (M is an integer equal to or greater than 2) subcarriers to IFFT section 103 in parallel.

IFFT section 103 allocates the modulated symbols to M subcarriers having frequencies orthogonal to each other, performs a fast Fourier transform and outputs the obtained time domain signal to P/S conversion section 104.

P/S conversion section 104 parallel-to-serial-converts the time domain signal and outputs the obtained OFDM signal to pit clip section 105.

When an instantaneous amplitude level of an OFDM signal is lower than a predetermined threshold, pit clip section 105 replaces this amplitude level with a predetermined threshold. In other words, when the instantaneous power of the OFDM signal is close to 0, pit clip section 105 converts the power value to a value which is greater than the actual value. Hereinafter, a clipping of instantaneous power which is close to 0 is referred to as a "pit clip."

Figure 3:
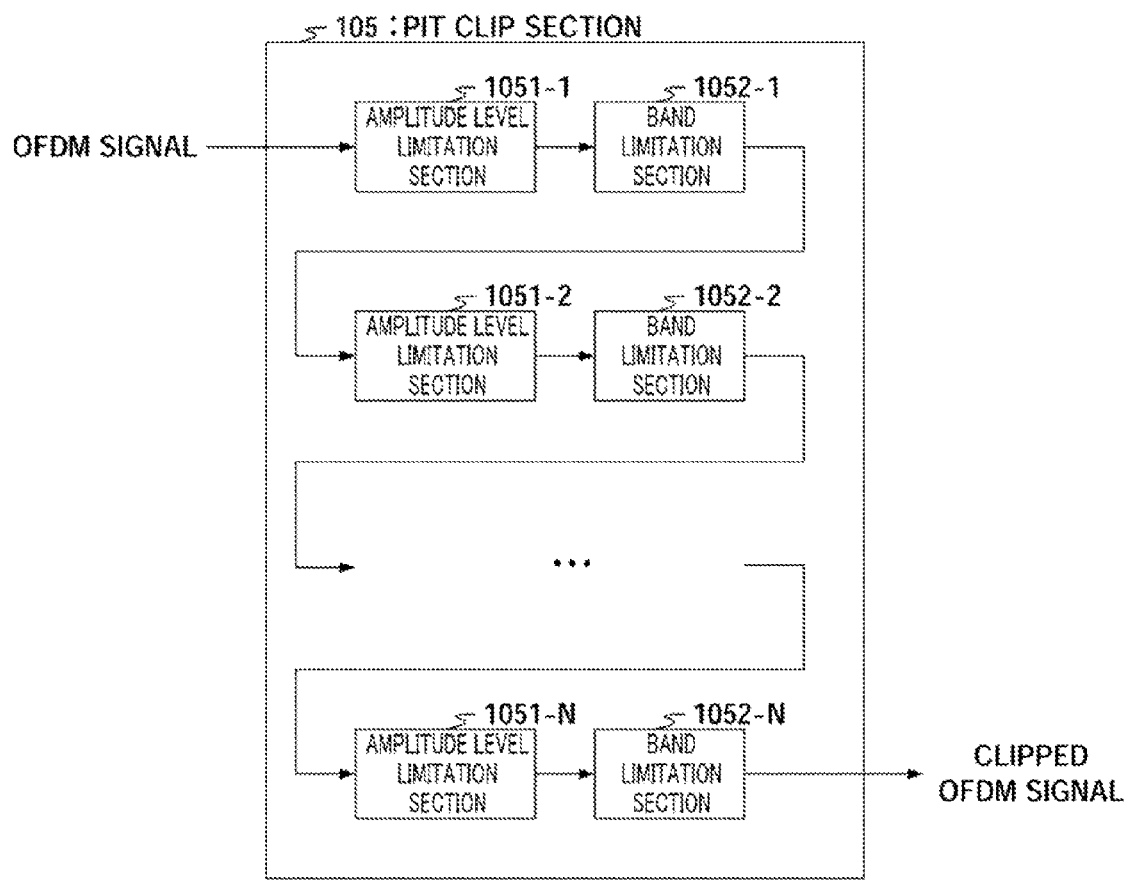
FIG. 3 is a block diagram showing the internal configuration of a pit clip section according to Embodiment 1.

A shown in FIG. 3, pit clip section 105 has amplitude level limitation sections 1051-1 to 1051-N and band limitation sections 1052-1 to 1052-N, and can make the signal approximate to a signal that meets a desired dynamic range and an out-of-band leakage characteristic at the same time by repeating the amplitude level limitation and band limitation N times.

Amplitude level limitation sections 1051-1 to 1051-N limit and convert an instantaneous amplitude level as shown in following equation 1. This conversion equation is an example, and any conversion equation may be used if instantaneous power lower than a set lower limit value can be converted to instantaneous power equal to or higher than this lower limit value.

[1]

$$f(x) = \begin{cases} A\min \cdot \dfrac{y}{|y|} & (x=0); y \text{ is average of samples before and after } x \\ A\min \cdot \dfrac{x}{|x|} & (0 < |x| < A\min) \\ x & (|x| \geq A\min) \end{cases} \quad \text{(Equation 1)}$$

In above equation 1, x represents an instantaneous signal, |x| represents an amplitude level (that is, square root of power) of instantaneous signal x, and Amin represents a predetermined threshold. Amplitude level limitation sections 1051-1 to 1051-N calculate f(x) from above equation 1, convert all power lower than Amin to Amin, and do not convert power equal to or higher than Amin. However, when amplitude x is 0, amplitude level limitation sections 1051-1 to 1051-N use average (y) of f(x) obtained earlier or later. These calculations can be carried out very easily and cause neither processing delay nor increase in the circuit scale.

Band limitation sections 1052-1 to 1052-N limit the bands of signals outputted from amplitude level limitation sections 1051-1 to 1051-N and remove signal component which leaks out of the band by the amplitude level limitations. An instantaneous signal smaller than Amin may occur again due to the band limitations, and therefore the present embodiment repeats amplitude level limitation and band limitation N times. By carrying out repetitions an appropriate number of times (N times), it is possible to obtain a clipped OFDM signal having a lower limit close to Amin while preventing out-of-band leakage.

Pit clip section 105 repeatedly performs the above-described amplitude limitation and band limitation and outputs a clipped OFDM signal subjected to a pit clip to quadrature modulation section 106.

Quadrature modulation section 106 performs quadrature modulation on the clipped OFDM signal, generates a transmission signal and outputs the signal to amplification section 107.

After amplifying the transmission signal, amplification section 107 transmits the signal through an antenna.

Next, the transmission operations of the multicarrier transmission apparatus configured as described above will be explained.

Transmission data is modulated by modulation section 101, serial-to-parallel-converted by S/P conversion section 102, and M modulated symbols corresponding to the number of subcarriers are outputted to IFFT section 103 in parallel.

Then, the modulated symbols are allocated to subcarriers by IFFT section 103 and subjected to an inverse fast Fourier transform, and thereby the signal is converted to a time domain signal, and parallel-to-serial-converted by P/S conversion section 104, and an OFDM signal including M subcarriers is generated.

The generated OFDM signal is inputted to amplitude level limitation section 1051-1 in pit clip section 105 and subjected to a conversion according to above equation 1. That is, when the instantaneous amplitude level of the sample of the inputted OFDM signal is lower than Amin, the amplitude level is converted to Amin, and, when the amplitude level is equal to or higher than Amin, the amplitude level is kept as is and outputted to band limitation section 1052-1.

Such an amplitude level limitation is non-linear processing, and signal components may leak out of the band. Therefore, after band limitation section 1052-1 removes the signal components which have leaked out of the band, the OFDM signal is outputted to amplitude level limitation section 1051-2. However, the instantaneous amplitude may be lower than Amin again due to band limitation.

Then, a conversion according to above equation 1 is performed again by amplitude level limitation section 1051-2. That is, the amplitude level limitation similar to the first limitation is performed, and signal components which have leaked out of the band are removed by band limitation section 1052-2.

Thus, by repeating amplitude level limitation and band limitation N times, a clipped OFDM signal with the power value close to 0 of the OFDM signal being raised, is obtained. As a result, a time-series power variation of the clipped OFDM signal when the power of one subcarrier is assumed to be 1 is as shown, for example, in FIG. 4.

Figure 4:
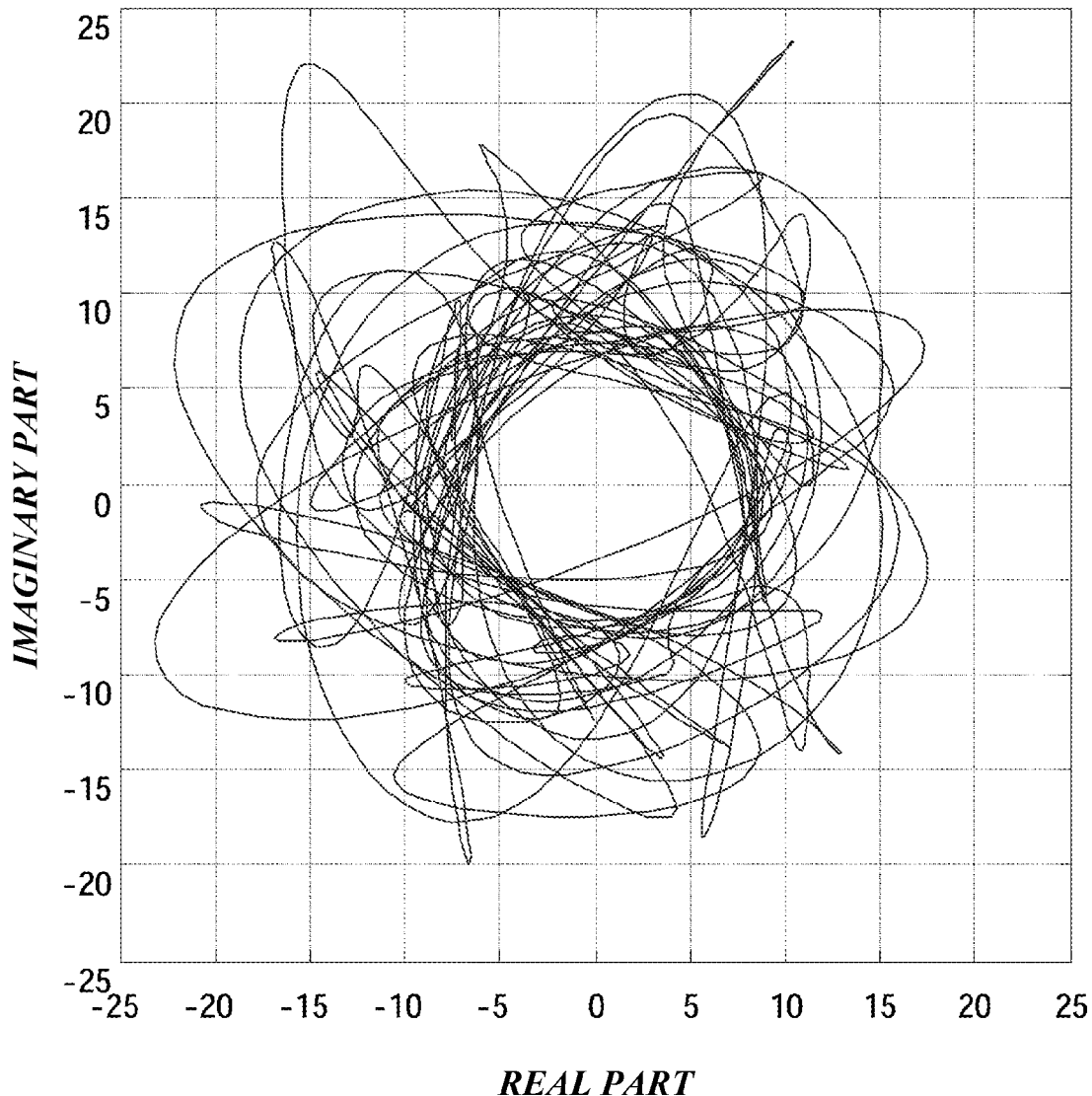
FIG. 4 shows a power variation of a clipped OFDM signal according to Embodiment 1.

FIG. 4 shows the amplitude of the clipped OFDM signal on a complex plane, and the distance from the origin (0, 0) shows power of the clipped OFDM signal at each time. As is clear from the same figure, according to the present embodiment, the power of the clipped OFDM signal never approximates to the origin (0, 0), and the minimum value in the dynamic range is raised. As a result, the clipped OFDM signal can narrow the dynamic range.

In this way, the clipped OFDM signal obtained as a result of the pit clip is quadrature modulated by quadrature modulation section 106, amplified by amplification section 107 and then transmitted through the antenna.

As described above, according to the present embodiment, when the power of the OFDM signal is close to 0, the power is raised, so that the OFDM signal power never approximates to 0 and the dynamic range of the OFDM signal can be narrowed.

Furthermore, band limitation through filtering is performed after a pit clip, so that it is possible to reliably remove a signal component which leaks out of the band through the pit clip which is non-linear processing.

Embodiment 2

A feature of Embodiment 2 of the present invention is not only a pit clip but also to reduce peak power at the same time.

Figure 5:
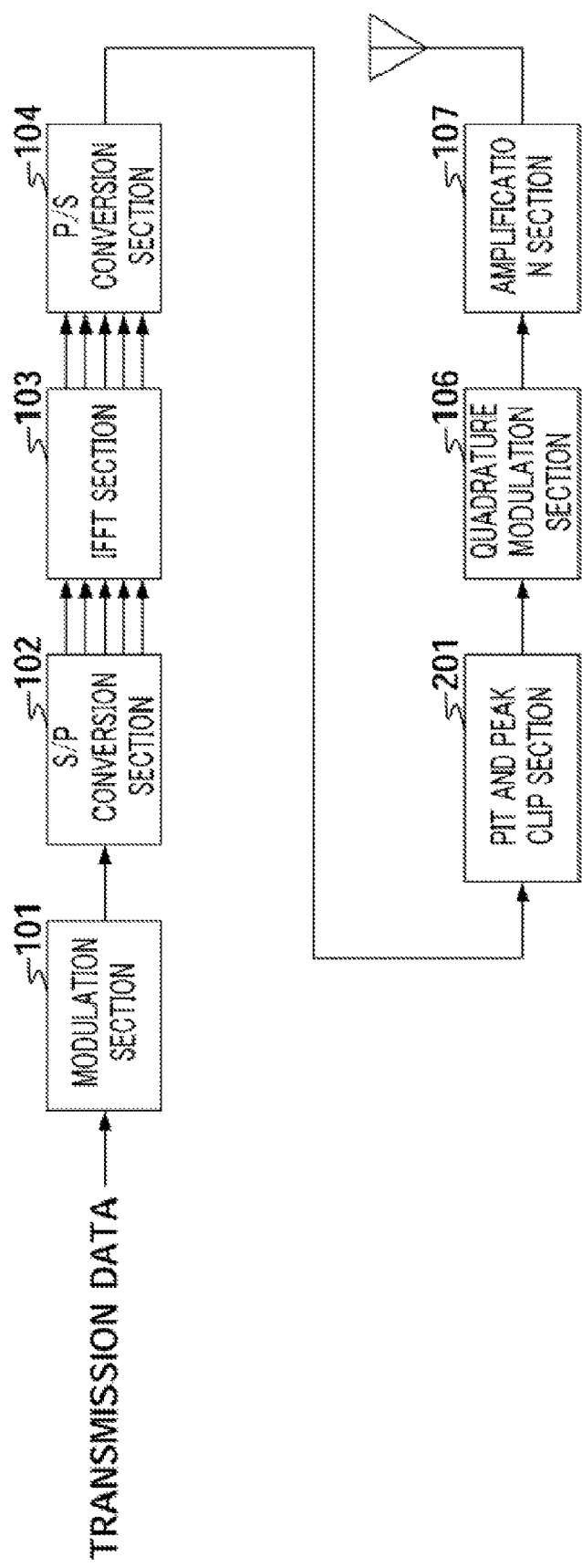
FIG. 5 is a block diagram showing the main configuration of a multicarrier transmission apparatus according to Embodiment 2 of the present invention.

FIG. 5 is a block diagram showing the main configuration of a multicarrier transmission apparatus according to the present embodiment. In this figure, the same reference numerals are assigned to the same parts as in FIG. 2, and explanations thereof will be omitted. The multicarrier transmission apparatus shown in FIG. 5 adopts a configuration having pit and peak clip section 201 instead of pit clip section 105 in FIG. 2.

When the amplitude level of the OFDM signal is lower than a predetermined first threshold, pit and peak clip section 201 replaces this amplitude level with the predetermined first threshold, and, when the amplitude level of the OFDM signal exceeds a predetermined second threshold, pit and peak clip section 201 replaces this amplitude level with the predetermined second threshold. In other words, when the power of the OFDM signal is close to 0, pit and peak clip section 201 converts the power value to a value greater than the actual value, and on the other hand, when the power of the OFDM signal is outstandingly large, pit and peak clip section 201 converts the power value to a value smaller than the actual value. That is, pit and peak clip section 201 performs clipping of peak power at the same time as a pit clip.

Pit and peak clip section 201 has an internal configuration similar to pit clip section 105 (FIG. 3), but differs from pit clip section 105 just in the following point. That is, amplitude level limitation sections 1051-1 to 1051-N of the present embodiment individually perform a limitation and conversion as expressed in following equation 2. This conversion equation is an example, and any conversion equation may be used if instantaneous power lower than a set lower limit value can be converted to a value equal to or greater than this lower limit value and instantaneous power which exceeds a set upper limit can be converted to a value equal to or smaller than this upper limit.

[2]

$$f(x) = \begin{cases} Amin \cdot \dfrac{y}{|y|} & (x = 0);\ y \text{ is average of samples before and after } x \\ Amin \cdot \dfrac{x}{|x|} & (0 < |x| < Amin) \\ x & (Amin \leq |x| < Amax) \\ Amax \cdot \dfrac{x}{|x|} & (Amax \leq |x|) \end{cases} \quad \text{(Equation 2)}$$

In above equation 2, x represents an amplitude, |x| represents an amplitude level (i.e., power), Amin represents a first threshold, Amax represents a second threshold, and there is a relationship of Amin<Amax. Amplitude level limitation sections 1051-1 to 1051-N calculate f(x) from above equation 2, convert all power lower than Amin to Amin, do not convert power equal to or higher than Amin and lower than Amax and convert all power equal to or higher than Amax to Amax. However, when amplitude x is 0, amplitude level limitation sections 1051-1 to 1051-N use average (y) of f(x) obtained earlier or later.

In this embodiment, clipping (peak clip) of outstanding peak power of the OFDM signal is carried out, while clipping (pit clip) of power close to 0 of the OFDM signal is carried out as with Embodiment 1. That is, amplitude level limitation sections 1051-1 to 1051-N replace all amplitude levels lower than lower limit Amin of the amplitude level with Amin and replace all amplitude levels equal to or higher than upper limit Amax of the amplitude level with Amax. Such a pit clip and peak clip are non-linear processing, so that band limitation sections 1052-1 to 1052-N remove signal components leaking out of the band. As a result, a time-series power variation of the clipped OFDM signal when the power of one subcarrier is assumed to be 1 is as shown, for example, in FIG. 6.

Figure 6:
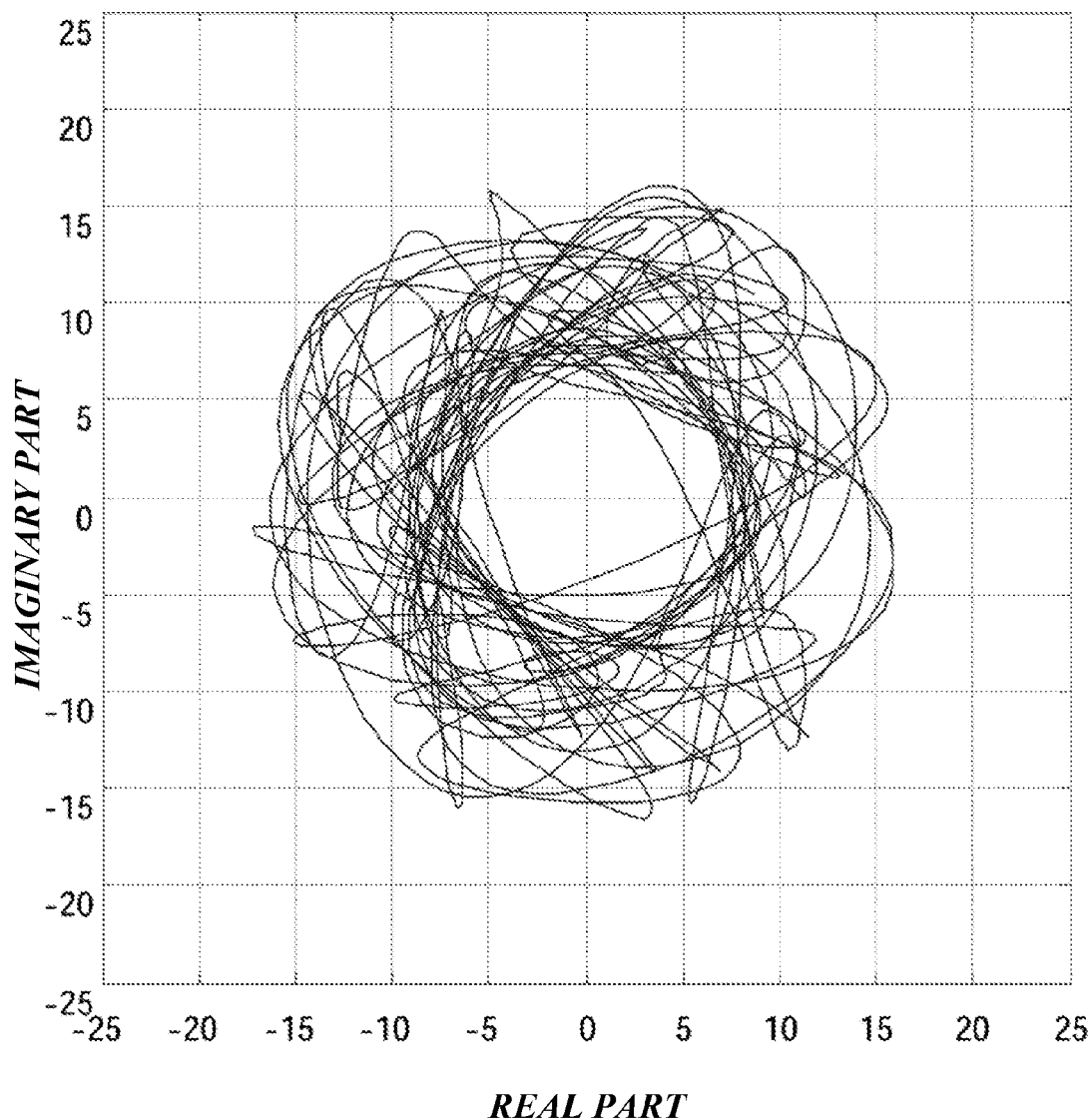
FIG. 6 shows a power variation of a clipped OFDM signal according to Embodiment 2.

FIG. 6 shows the amplitude of the clipped OFDM signal on a complex plane like FIG. 4, and the distance from the origin (0, 0) shows power of the clipped OFDM signal at each time. As is clear from the same figure, according to the present embodiment, the power of the clipped OFDM signal never approximates to the origin (0, 0), falls within a fixed range from the origin (0, 0), and the dynamic range is narrowed.

As described above, according to the present embodiment, when power of the OFDM signal is close to 0, the power is raised, and, when the power of the OFDM signal is outstanding, the power is reduced, so that it is possible to prevent the power of the OFDM signal from approximating to 0 or becoming outstanding and reliably narrow the dynamic range of the OFDM signal.

In above Embodiments 1 and 2, to keep the phase of a signal, normalization is performed with an amplitude, but it is also possible to make values converge to an optimum value while changing not only the amplitude but also the phase through, for example, generic algorithm (GA).

Embodiment 3

This embodiment presents the configuration of a pit clip section which is different from pit clip section 105 (FIG. 3) explained in Embodiment 1.

Figure 7:
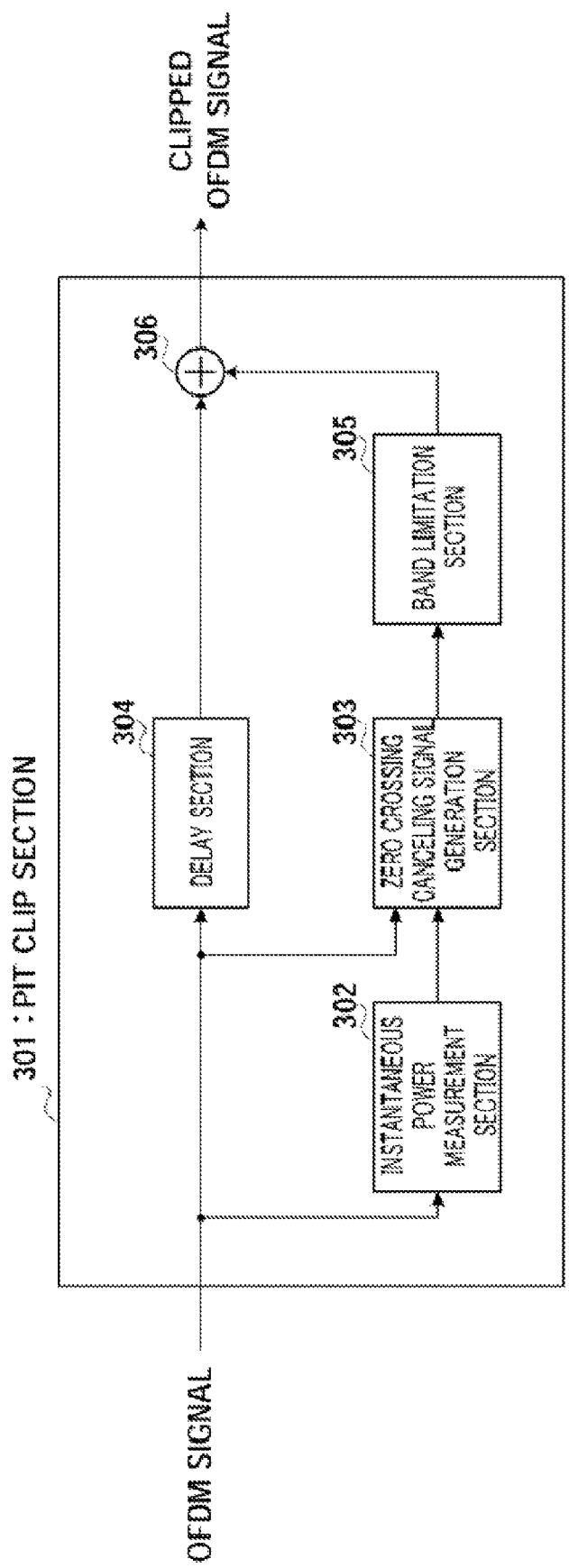
FIG. 7 is a block diagram showing the internal configuration of a pit clip section according to Embodiment 3.

FIG. 7 shows the configuration of the pit clip section of the present embodiment. Pit clip section 301 in FIG. 7 is used instead of pit clip section 105 of the multicarrier transmission apparatus in FIG. 2.

Pit clip section 301 inputs an OFDM signal outputted from P/S conversion section 104 (FIG. 2) to instantaneous power measurement section 302, zero crossing canceling signal generation section 303 and delay section 304. Instantaneous power measurement section 302 measures the instantaneous power of the inputted OFDM signal and outputs the measured value to zero crossing canceling signal generation section 303.

Zero crossing canceling signal generation section 303 compares the instantaneous power with a preset threshold, and, when the sample value is greater than the threshold, zero crossing canceling signal generation section 303 outputs 0 to band limitation section 305 as a zero crossing canceling signal. On the other hand, when the sample value is equal to or smaller than the threshold, zero crossing canceling signal generation section 303 outputs a zero crossing canceling signal having the same phase as the original sample value and an amplitude value equal to the threshold, to band limitation section 305.

Band limitation section 305 limits the band of the inputted zero crossing canceling signal and outputs the signal to adder 306. Adder 306 obtains a clipped OFDM signal by multiplexing the zero crossing canceling signal on the OFDM signal delayed by delay section 304 so as to be in synchronization with the zero crossing canceling signal.

Figure 8B:
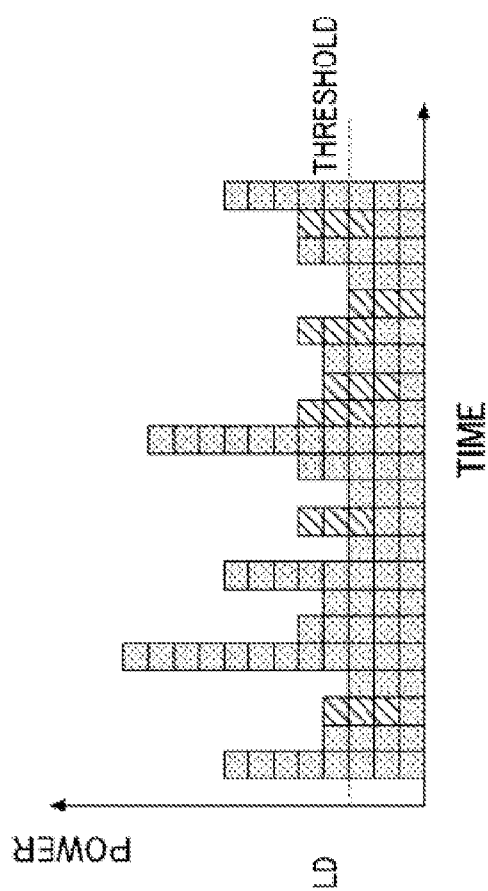
FIG. 8B shows a time waveform after the processing.
Figure 8A:
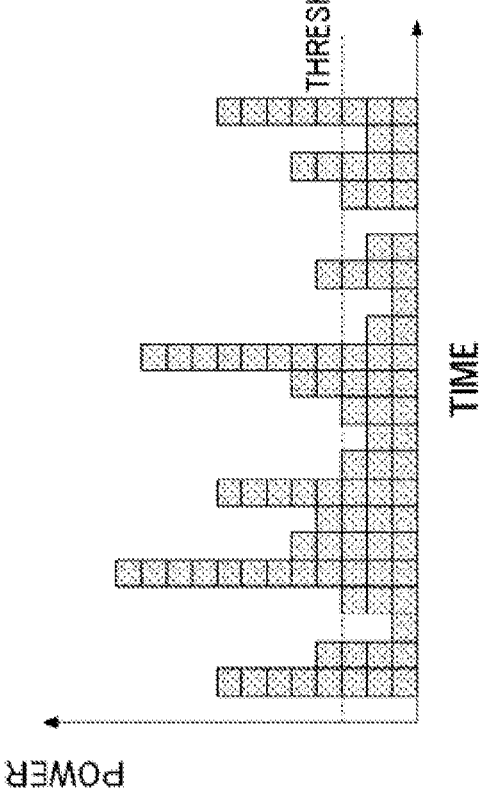
FIG. 8A shows a time waveform before the processing.

FIG. 8 shows a time waveform before and after the processing by pit clip section 301. FIG. 8A shows a time waveform of the OFDM signal before a pit clip, and FIG. 8B shows a time waveform of the OFDM signal (that is, clipped OFDM signal) after the pit clip by pit clip section 301.

As is also clear from FIG. 8, the dynamic range of the signal before the pit clip shown in FIG. 8A falls within a range from 0 to a peak level, while the dynamic range of the signal after the pit clip shown in FIG. 8B is narrowed to a range from the threshold to the peak level at maximum.

As described above, the present embodiment provides: instantaneous power measurement section 302 that samples an OFDM signal and measures instantaneous power; zero crossing canceling signal generation section 303 that compares the instantaneous power value with a predetermined threshold and generates, when the instantaneous power value is equal to or smaller than the threshold, a zero crossing canceling signal having the same phase as the sampled OFDM signal and the same amplitude value as the threshold; and adder 306 that adds the zero crossing canceling signal to the OFDM signal, so that it is possible to prevent the overall power of the OFDM signal from approximating to 0 and narrow the dynamic range of the OFDM signal.

Band limitations at band limitation section 305 can be realized with an arbitrary bandwidth. Furthermore, if zero crossing canceling signal generation section 303 stores a signal subjected to band limitation beforehand in a memory, band limitation section 305 can be omitted. That is, successive calculations at band limitation section 305 can be omitted. In such a case, zero crossing canceling signal generation section 303 may adjust the phase of the waveform stored in the memory to the original sample value and output the result to adder 306.

Embodiment 4

The multicarrier transmission apparatus of this embodiment differs from the multicarrier transmission apparatus of Embodiment 3 in the zero crossing canceling signal generated by zero crossing canceling signal generation section 303 of pit clip section 301 in FIG. 7. The rest of the configuration is the same as the configuration of Embodiment 3 shown in FIG. 7, and therefore, explanations thereof will be omitted.

In Embodiment 3, when the instantaneous power sampled from the OFDM signal is equal to or lower than the threshold, zero crossing canceling signal generation section 303 generates a zero crossing canceling signal having the same phase as the sampled OFDM signal and having an amplitude value equal to the threshold.

On the other hand, in this embodiment, when the instantaneous power sampled from the OFDM signal is equal to or lower than the threshold, zero crossing canceling signal generation section 303 generates a zero crossing canceling signal having the same phase as the sampled OFDM signal and having an amplitude value equal to the difference between the threshold and the sample value.

Figure 9B:
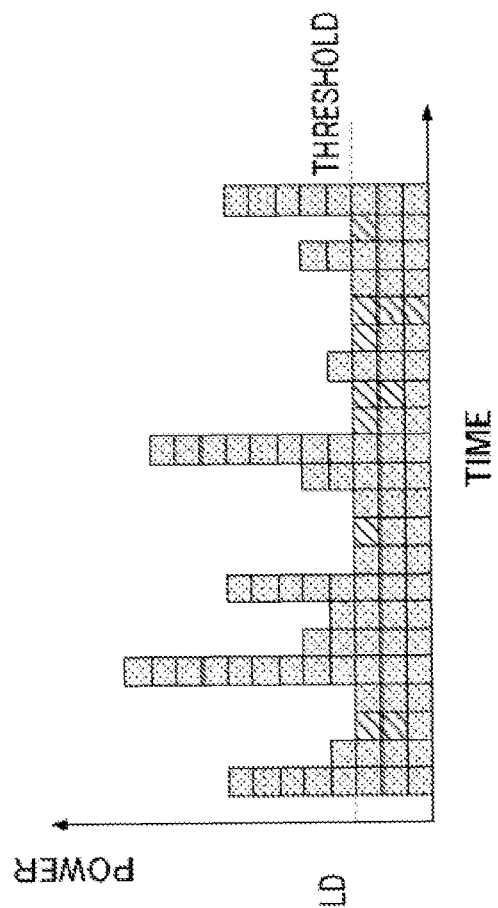
FIG. 9B shows a time waveform after the processing.
Figure 9A:
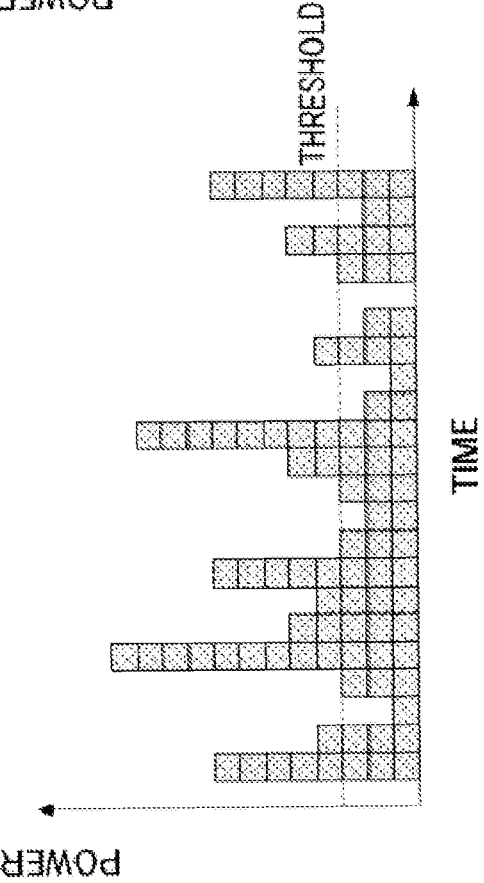
FIG. 9A shows a time waveform before the processing.

FIG. 9 shows a time waveform before and after the processing by pit clip section 301 when using a zero crossing canceling signal according to this embodiment. FIG. 9A shows a time waveform of the OFDM signal before a pit clip, and FIG. 9B shows a time waveform of the OFDM signal (that is, clipped OFDM signal) after the pit clip by pit clip section 301.

As is also clear from FIG. 9, the dynamic range of the signal before the pit clip shown in FIG. 9A falls within a range from 0 to a peak level, while the dynamic range of the signal after the pit clip shown in FIG. 9B is narrowed to a range from a threshold to a peak level.

Compared to Embodiment 3, by preventing additions of extra signals to the original OFDM signal, the present embodiment can make the minimum power value equal to the threshold, so that it is possible to reduce distortion of the signal. That is, the processing of preventing power of an OFDM signal from approximating to 0 and narrowing the dynamic range of the OFDM signal can be performed while preventing the occurrence of signal distortion.

In Embodiment 3 and Embodiment 4, processing is performed so as to make the phase of a zero crossing canceling signal equal to the phase of the original sample value, but, when the amplitude at the sample point is completely 0, the phase may be adjusted to the phase of a sample value immediately before or immediately after. Alternatively, the phase may be adjusted to the phase of an average of a sample value immediately before or immediately after.

Furthermore, one feature of Embodiments 3 and 4 is to generate a zero crossing canceling signal having the same phase as the sampled OFDM signal, but the phase of the zero crossing canceling signal may also be determined based on the phases at sample points before and after the original sample point. That is, the "same phase" is not limited to the meaning of having the same phase as the phase of one original sample point, but can also include, for example, a phase obtained from an average of the phases at sample points before and after the original sample point.

If the processing at the pit clip section described in Embodiments 3 and 4 is repeatedly performed, the zero crossing avoidance effect can be further improved.

Furthermore, if an input OFDM signal is oversampled, it is possible to further improve the zero crossing avoidance effect.

Furthermore, Embodiments 3 and 4 have described the method of limiting low limit power of a multicarrier signal, but the methods in Embodiments 3 and 4 may also be implemented in combination with a peak cancellation signal multiplexing scheme, which is well known as a method of limiting the upper limit power of a multicarrier signal.

Figure 10:
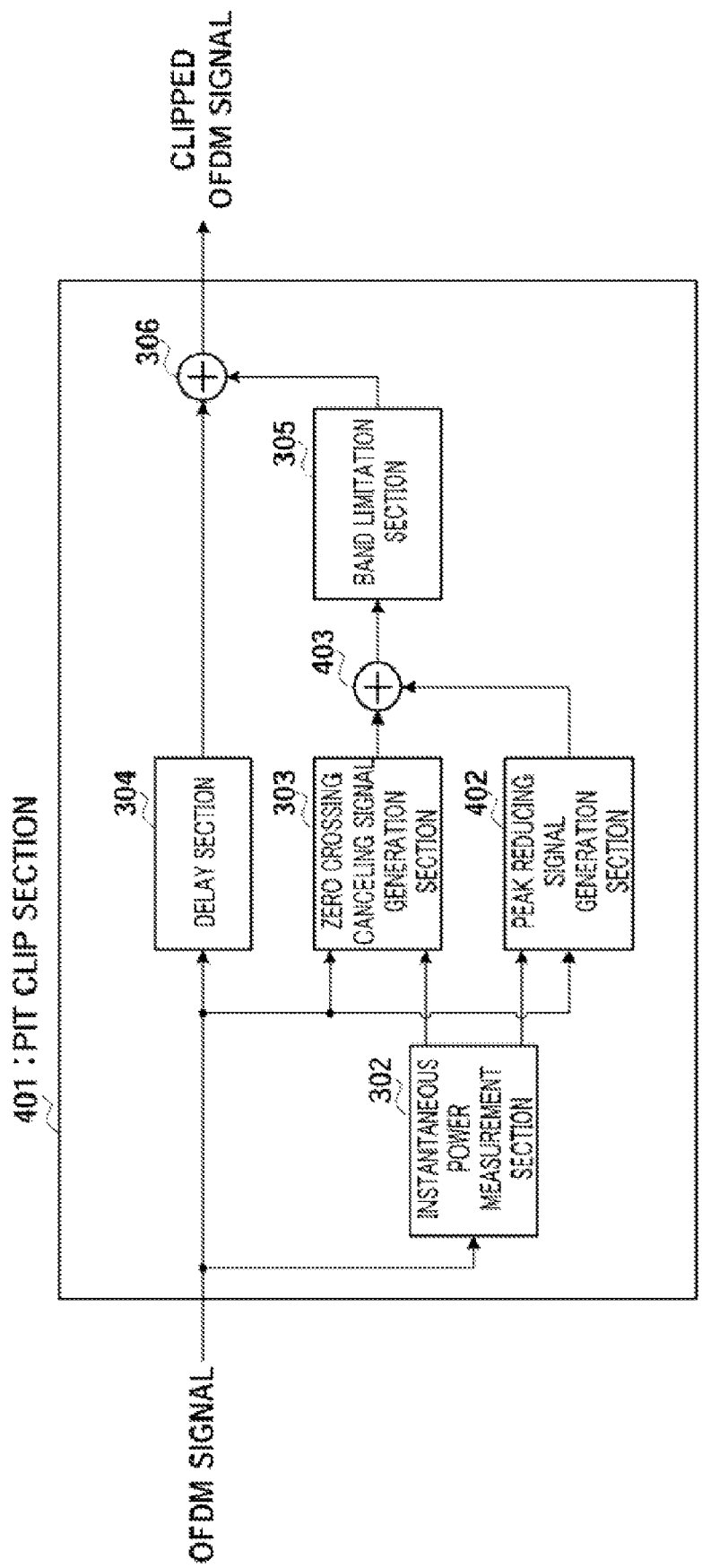
FIG. 10 is a block diagram showing another configuration example of the pit clip section.

FIG. 10 shows an example of the configuration in that case. In FIG. 10 where the same reference numerals are assigned to the same parts as in FIG. 7, pit clip section 401 has peak reduction signal generation section 402 and adder 403. When instantaneous power exceeds a predetermined threshold, peak reduction signal generation section 402 generates a peak reduction signal having a phase opposite to the phase at the sample point. In addition, the threshold used at peak reduction signal generation section 402 is naturally a value greater than the threshold used at zero crossing canceling signal generation section 303.

The present application is based on Japanese Patent Application No. 2005-186425, filed on Jun. 27, 2005, the entire content of which is expressly incorporated by reference herein.

INDUSTRIAL APPLICABILITY

The multicarrier transmission apparatus and multicarrier transmission method of the present invention can narrow the dynamic range of a multicarrier signal and prevent an increase in cost and deterioration of power efficiency, and are suitable as a multicarrier transmission apparatus and multicarrier transmission method where an instantaneous power value of a transmission signal may become 0, for example.

The invention claimed is:

1. A multicarrier transmission apparatus comprising:
a generation section that generates a multicarrier signal having a plurality of subcarriers;
a conversion section that converts a first amplitude level of the multicarrier having a first value lower than a predetermined lower limit value of the multicarrier signal, to a second amplitude level equal to or higher than the lower limit value; and
a transmission section that transmits the multicarrier signal after the amplitude level conversion, wherein:
the conversion section comprises:
an amplitude level limitation section that limits a third amplitude level of the multicarrier signal to the second amplitude level equal to or higher than the lower limit value; and
a band limitation section that removes a signal component of the multicarrier signal after the amplitude level limitation, wherein the signal component leaks out of a band due to the amplitude level limitation.

2. The multicarrier transmission apparatus according to claim 1, wherein the conversion section converts a fourth amplitude level of the multicarrier signal, having a second value equal to or higher than a predetermined upper limit of the multicarrier signal, to a fifth amplitude level equal to or lower than the upper limit value, in addition to converting the first amplitude level lower than the lower limit value of the multicarrier signal to the second amplitude level equal to or higher than the lower limit value.

3. The multicarrier transmission apparatus according to claim 1, wherein the conversion section converts amplitude x of the multicarrier signal to amplitude f(x), having an amplitude level equal to or higher than lower limit value Amin, according to:

$$f(x) = \begin{cases} A_{min} \cdot \dfrac{x}{|x|} & (0 < |x| < A_{min}) \\ x & (|x| \geq A_{min}) \end{cases}.$$

4. The multicarrier transmission apparatus according to claim 3, wherein the conversion section converts amplitude x of the multicarrier signal to amplitude f(x), having an amplitude level lower than upper limit Amax, according to:

$$f(x) = A_{max} \cdot \dfrac{x}{|x|} \quad (A_{max} \leq |x|).$$

5. The multicarrier transmission apparatus according to claim 1, wherein the conversion section comprises:
an instantaneous power measurement section that measures instantaneous power by sampling the multicarrier signal to generate a sampled multicarrier signal;
a zero crossing canceling signal generation section that compares an instantaneous power value with a predetermined threshold and generates, when the instantaneous power value is equal to or lower than the threshold, a zero crossing canceling signal having a same phase as the sampled multicarrier signal and having an amplitude value equal to the threshold; and
an addition section that adds the zero crossing canceling signal to the multicarrier signal.

6. The multicarrier transmission apparatus according to claim 1, wherein the conversion section comprises:
an instantaneous power measurement section that samples the multicarrier signal to generate a sampled multicarrier signal, and measures an instantaneous power;
a zero crossing canceling signal generation section that compares the instantaneous power value with a predetermined threshold and generates, when the instantaneous power value is equal to or lower than the threshold, a zero crossing canceling signal having a same phase as the sampled multicarrier signal and having an amplitude value equal to a difference between the threshold and a sample value of the multicarrier signal; and
an addition section that adds the zero crossing canceling signal to the multicarrier signal.

7. A multicarrier transmission method comprising:
generating a multicarrier signal having a plurality of subcarriers;
converting a first amplitude level of the multicarrier signal, having a first value lower than a predetermined lower limit value of the multicarrier signal, to a second amplitude level having a second value equal to or higher than the lower limit value; and transmitting the multicarrier signal after the amplitude level conversion, wherein the amplitude level conversion comprises:

limiting a third amplitude level of the multicarrier signal to the second amplitude level equal to or higher than the lower limit value; and removing a signal component of the multicarrier signal after the amplitude level limitation, wherein the signal component leaks out of a band due to the amplitude level limitation.

\* \* \* \* \*